US008346469B2

(12) United States Patent
Trautenberg

(10) Patent No.: US 8,346,469 B2
(45) Date of Patent: Jan. 1, 2013

(54) METHOD AND DEVICE FOR DETERMINING PROTECTION LEVELS FOR SATELLITE NAVIGATION SYSTEMS

(75) Inventor: Hans Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 12/178,450

(22) Filed: Jul. 23, 2008

(65) Prior Publication Data

US 2009/0043503 A1 Feb. 12, 2009

Related U.S. Application Data

(63) Continuation of application No. PCT/DE2007/000135, filed on Jan. 22, 2007.

(30) Foreign Application Priority Data

Jan. 23, 2006 (DE) .......................... 10 2006 003 308

(51) Int. Cl.
*G01C 21/00* (2006.01)

(52) U.S. Cl. ........ 701/400; 701/408; 701/412; 701/468; 701/469; 701/473; 701/475; 701/476; 701/477; 701/507; 701/534; 342/357.58

(58) Field of Classification Search .................. 701/213, 701/400, 408, 412, 468, 469, 473, 475, 476, 701/477, 507, 534; 342/357, 357.58
See application file for complete search history.

(56) References Cited

U.S. PATENT DOCUMENTS

| | | | | |
|---|---|---|---|---|
| 5,969,670 | A * | 10/1999 | Kalafus et al. ........... | 342/357.02 |
| 6,268,858 | B1 * | 7/2001 | Nathman et al. .............. | 345/419 |
| 6,281,836 | B1 * | 8/2001 | Lupash et al. ........... | 342/357.58 |
| 6,515,618 | B1 * | 2/2003 | Lupash .................... | 342/357.29 |
| 6,847,893 | B1 * | 1/2005 | Lupash ......................... | 701/476 |
| 2001/0020214 | A1 * | 9/2001 | Brenner ........................ | 701/213 |

OTHER PUBLICATIONS

Veit Oehler et al: *User Integrity Risk Calculation at the Alert Limit without Fixed Allocations*, ION GNSS 17th International Technical Meeting of the Satellite Division, Sep. 21-24, 2004, Long Beach, CA; pp. 1645 through 1652 (XP-002375519).

(Continued)

*Primary Examiner* — John Q Nguyen
*Assistant Examiner* — Rodney P King
(74) *Attorney, Agent, or Firm* — Crowell & Moring LLP

(57) ABSTRACT

A method and apparatus for determining protection levels in a satellite navigation system includes the following steps: (1) determining an integrity risk at the alert limit for a plurality of application situations—for example, starting from approaches in category I (Category I precision approach) up to the operation "oceanic enroute;" (2) determining an interval of the alert limits between the largest set of alert limits which produces too high an integrity risk, and the smallest set of alert limits which produces an acceptable integrity risk; and (3) carrying out an interval nesting for the interval of the alert limits that was determined in the previous step, the integrity risk between the horizontal and the vertical being divided in the same way as it is obtained from the relationship between these integrity risks in the largest set of alert limits.

6 Claims, 2 Drawing Sheets

OTHER PUBLICATIONS

Jason Rife et al: *Core Overbounding and its Implications for LAAS Integrity*, ION GNSS 17th International Technical Meeting of the Satellite Division, Sep. 21-24, 2004, Long Beach, CA; pp. 2810 through 2821 (XP-002398122).

Per Enge: *Local Area Augmentation of GPS for the Precision Approach of Aircraft*; Proceedings of the IEEE, vol. 87, No. 1, Jan. 1999; pp. 111-132.

International Search Report and Written Opinion (PCT/DE2007/000135) and translation of relevant portions thereof (18 pages).

Written Opinion of the International Searching Authority (eight (8) pages).

* cited by examiner

METHOD AND DEVICE FOR DETERMINING PROTECTION LEVELS FOR SATELLITE NAVIGATION SYSTEMS

This application is a continuation of PCT International Application No. PCT/DE2007/000135, filed Jan. 22, 2007, which claims priority under 35 U.S.C. §119 to German Patent Application No. 10 2006 003 308.6, filed Jan. 23, 2006, the entire disclosure of which is herein expressly incorporated by reference.

The invention relates to a method and apparatus for determining the protection levels for a satellite navigation system.

BACKGROUND OF THE INVENTION

To those skilled in the art of satellite navigation systems, the term "integrity" refers to the degree of confidence that a user of a satellite navigation system can have that the position information provided by the system is "correct"; that is, it is within acceptable limits. The maximum tolerable error in such position information is called an "alert limit" (including a horizontal alert limit and a vertical alert limit), and the term "integrity risk" refers to the probability that the system will fail to provide a warning within a specified time period after a given alert limit has been exceeded.

The requirements for integrity performance (and the associated horizontal and vertical alert limits) vary as between several different phases of flight, such as APV (approach with vertical guidance) APV I, APV II, CAT I (category I precision approach), oceanic, and en route/terminal. The table set forth below shows typical examples:

TABLE I

| number | Phase of Flight | Integrity Risk | Horizontal/Vertical Alert Limit [m] |
|---|---|---|---|
| 1 | Oceanic en-route | $10^{-7}$/hour | 7412/— |
| 2 | En-route/Terminal | $10^{-7}$/hour | 556/— |
| 3 | APV | $2 \times 10^{-7}$/150 sec | 556/50 |
| 4 | APV I | $2 \times 10^{-7}$/150 sec | 40/20 |
| 5 | APV II | $2 \times 10^{-7}$/150 sec | 40/10 |
| 6 | CAT I | $10^{-9}$/15 sec | 20/10 |

The specification for the satellite navigation system Galileo demands only an integrity service with a specified integrity risk for fixed horizontal and vertical alarm limits. However, for applications in the area of flight safety the subscribed users require a concept that demands different integrity requirements in different phases of the flight (such as set forth above). In addition, the user groups are not satisfied with knowing the integrity risk at the alarm limit, but rather demand so-called protection levels.

The prior art does not address the problem of different integrity risks for different integrity requirements. Furthermore, there do not exist any solutions that are optimal for alert limits that are larger than the smallest set of alert limits.

One object of the present invention is to provide a method and apparatus that make it possible for a receiver to calculate the integrity risk, without having to know the momentary flight phase.

This object is achieved by a method for determining protection levels in a satellite navigation system which comprises the following steps: (1) determining an integrity risk at the alert limits for a variety of flight phases or situations, (2) determining an interval of the alert limits, between the largest set of alert limits and the integrity risk which produces too high an integrity risk, and the smallest set of alert limits and the integrity risk which produces an acceptable integrity risk; and (3) carrying out an interval nesting for the interval of the alert limits that was determined in the previous step. In this case the integrity risk between the horizontal and the vertical is divided in the same way as it is obtained from the relationship between these integrity risks in the largest set of alert limits.

When the integrity risk is determined in this manner, by the method, according to the invention, it is no longer necessary to know the momentary flight phase, because the protection level is always determined in such a way that when the protection level for a flight phase has met the requirements of Table 3.7.2.4-1 in Part 1 of the Annex 10 to the ICAO Convention (International Civil Aviation Organization Convention), the integrity risk is correctly selected. Due to the choice of the division, the smallest possible alert limit is also always determined. Due to the interval nesting it is guaranteed that the integrity risk is always conservative. And due to the interval nesting, smaller conservative alert limits can be determined through the use of better processors in the receiver.

The invention also includes a device for determining the protection levels in a satellite navigation system, which includes elements for performing the method steps described above. As mentioned, the integrity risk between the horizontal and the vertical is divided in the same way as it is obtained from the relationship between these integrity risks in the largest set of alert limits.

Since the device determines the integrity risk in this manner, by the method according to the invention, it is no longer necessary for the device to know the momentary flight phase; because the protection level is always determined in such a way that when the protection level for a flight phase has met the requirements of Table 3.7.2.4-1 in Part 1 of the Annex 10 to the ICAO Convention, the integrity risk is correctly selected. Due to the choice of the division, the smallest possible alert limit is also always determined. Due to the interval nesting, the integrity risk is always conservative. And due to the interval nesting it is also achieved that smaller conservative alert limits can be determined through the use of better processors in the receiver.

Other objects, advantages and novel features of the present invention will become apparent from the following detailed description of the invention when considered in conjunction with the accompanying drawings.

DETAILED DESCRIPTION OF THE DRAWINGS

Figure 1:
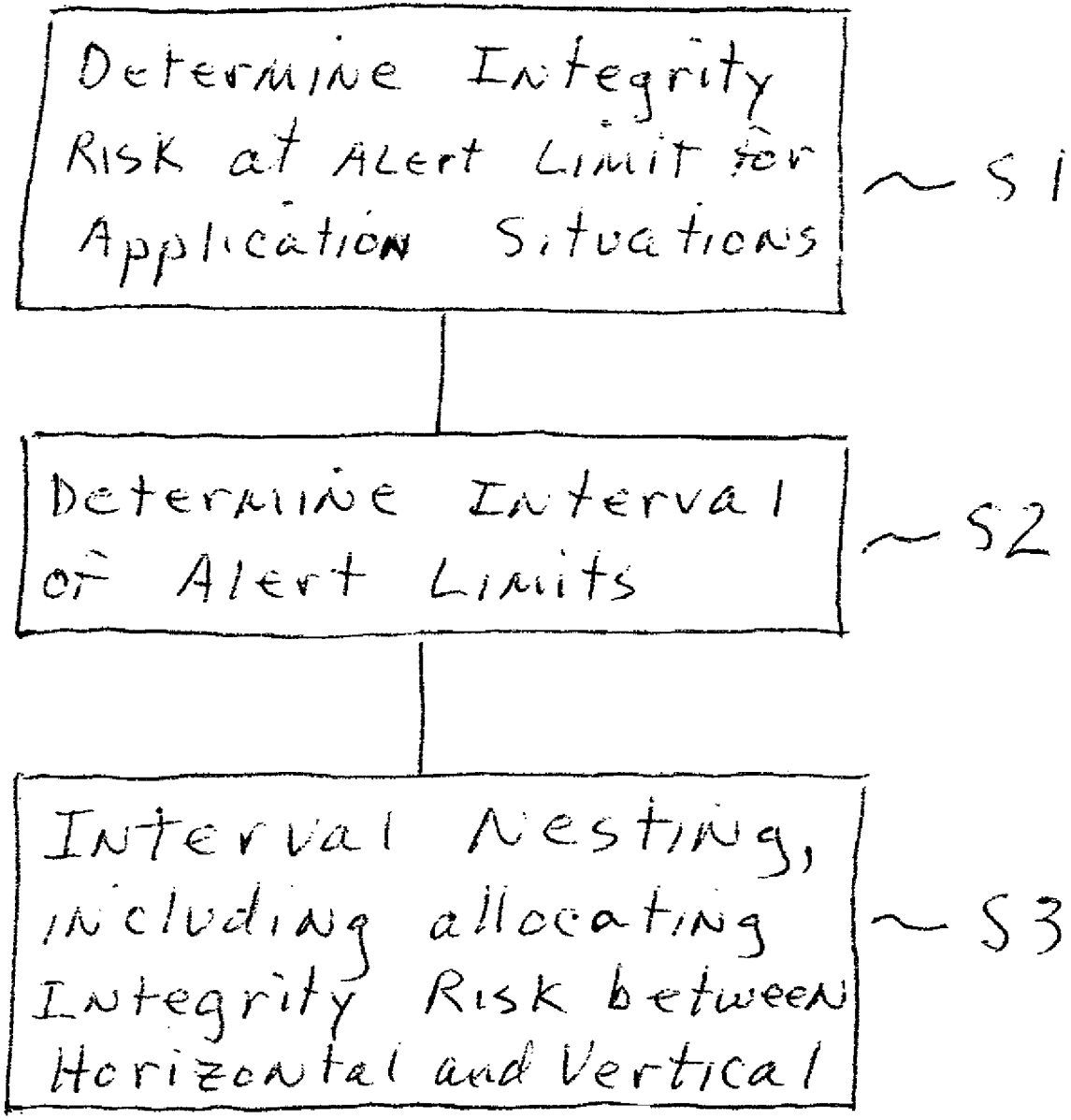
FIG. 1 illustrates the steps of the method according to the invention.

FIG. 1 illustrates one embodiment of the method according to the invention. In a first step S1 the integrity risk at the applicable alert limit is determined for each of a plurality of application situations—for example, starting with approaches in CAT I (Category I precision approach) up to the operation "oceanic enroute" (as in the Table 3.7.2.4-1 in Part 1 of the Annex 10 to the ICAO Convention). For this purpose, the integrity risk at the alert level may be determined in a manner known to those skilled in the art, such as described for example, in the Galileo Integrity Concept (PCT/EP2005/010038) or by any other known formula. For some flight phases the computed integrity risk might be below the integrity risk allowed for; for other phases of flight the integrity risk might be above.

In a second step S2, the interval of the alert limits is determined between the largest set of alert limits and the integrity risk which produces too high an integrity risk, and the smallest set of alert limits and the integrity risk which produces an acceptable integrity risk. In a third step S3 an interval nesting is carried out for the interval of the alert limits that was determined in the second step. In this step, the integrity risk between the horizontal and the vertical is divided in the same way as it is obtained from the relationship between these integrity risks in the largest set of alert limits.

For the description of this text it is assumed that the requirements are met for the sets number 1 to 3 but not for the sets 4 to 6, as set forth in Table I above. One object of the invention is to determine down to which combination of alert limits it is possible to achieve sufficiently low integrity risks. For this purpose, it is computed which fraction of the total integrity risk is associated with the horizontal and which fraction is associated with the vertical problem. If the horizontal integrity risk at the horizontal alert limit (HAL) is p_h(HAL) and the vertical integrity risk at the vertical alert limit (VAL) is p_v(VAL) then the vertical fraction v is p_v(VAL)/(p_h(HAL)+p_v(VAL)) and the horizontal fraction h is p_h(HAL)/(p_h(HAL)+p_v(VAL)); in the example, HAL=556 m and VAL=50 m. The allocated integrity risks are now computed as p-alloc_h=p_int*h and p-alloc_v=p_int*v, where p_int is the integrity risk given in the table (in our case $2 \times 10^{-7}/150$ sec. The protection levels are now computed in two independent sequences of nested intervals.

For the first sequence of nested intervals, which is concerned with the horizontal problem, an interval between 556 and 40 m is first addressed. The horizontal integrity risk at the center if the interval is computed, and if it is larger than p_alloc_h, the new lower end of the interval is the old center and the sequence continues. If the horizontal integrity risk at the center of the interval is smaller than or equal to p_alloc_h, the new upper end of the interval is the old center and the sequence continues. As soon as the length of the interval is sufficiently small (normally 1% of the lower value of the interval), the horizontal protection level is set to the upper end of the interval.

For the second sequence of nested intervals, which is concerned with the vertical problem, an interval between 50 and 20 m is used first. Then the vertical integrity risk at the center of the interval is computed. If the vertical integrity risk at the center of the interval is larger than p-alloc_v, the new lower end of the interval is the old center and the sequence continues. If the vertical integrity risk at the center of the interval is smaller or equal than p-alloc_v, the new upper end of the interval is the old center and the sequence continues. As soon as the length of the interval is sufficiently small (normally 1% of the lower value of the interval), the vertical protection level is set to the upper end of the interval.

As noted previously, using this method, it is no longer necessary for the receiver to know the momentary flight phase, because it always calculates the protection level in such a way that when the protection level for a flight phase has met the requirements of Table 3.7.2.4-1 in Part 1 of the Annex 10 to the ICAO Convention, the integrity risk is correctly selected. Due to the choice of the division, the smallest possible alert limit is also always determined. Due to the interval nesting it is guaranteed that the integrity risk is always conservative, and smaller conservative alert limits can be determined through the use of better processors in the receiver.

Figure 2:
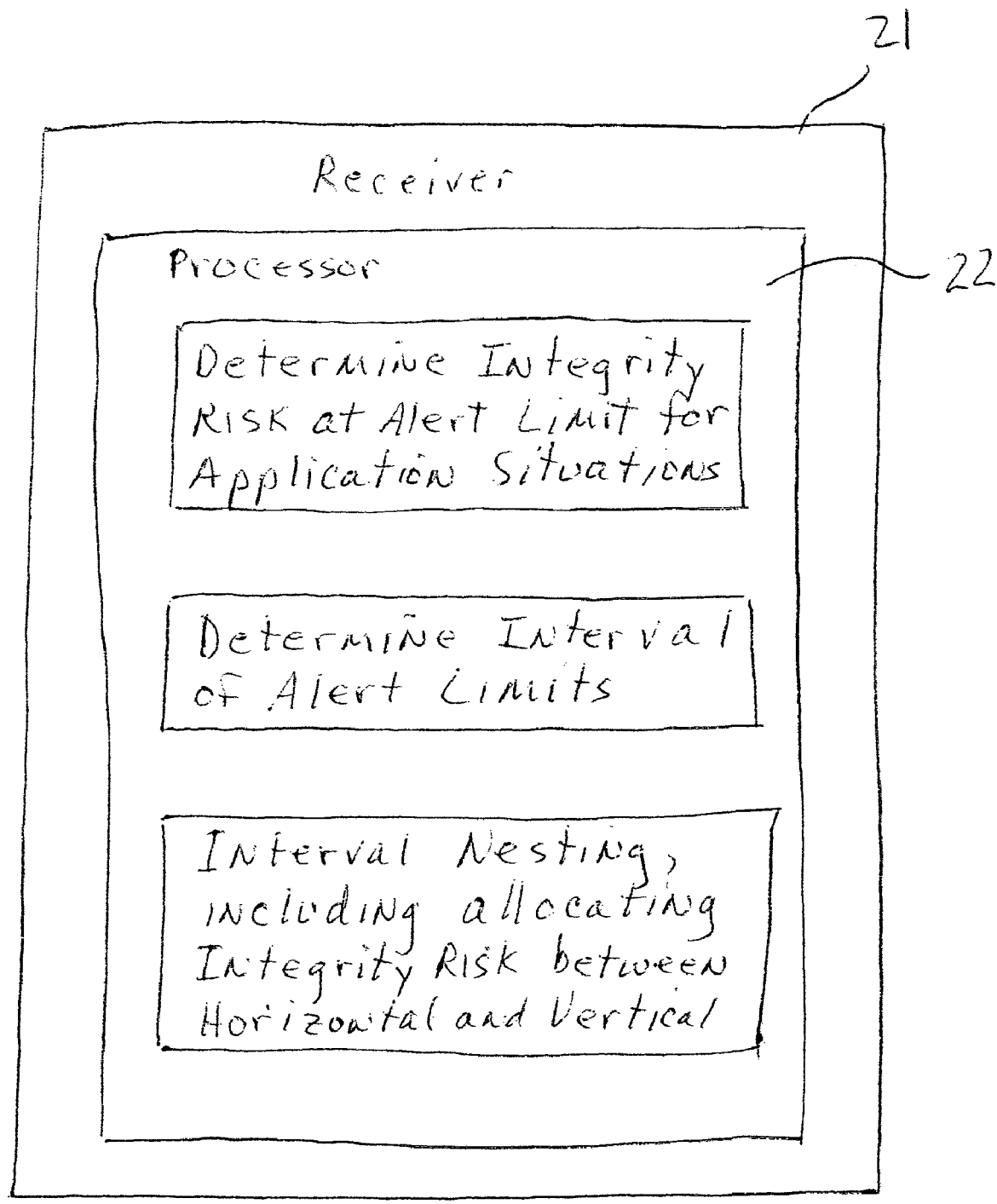
FIG. 2 is a schematic block diagram of a device for performing the method according to the invention.

FIG. 2 illustrates an additional embodiment of the invention which provides a device that is configured to perform the method according to the invention. Such a device is, for example, the receiver 21 or part of a receiver for receiving the signals of satellite navigation systems. The processor 22 of the device calculates the integrity risk by the method according to the invention. It is therefore no longer necessary to know the momentary flight phase, because it always calculates the protection level in such a way that when the protection level for a flight phase has met the requirements of Table 3.7.2.4-1 in Part 1 of the Annex 10 to the ICAO Convention, even the integrity risk is correctly selected. As with regard to the method according to the invention, due to the choice of the division, the smallest possible alert limit is also always determined, while due to the interval nesting it is guaranteed that the integrity risk is always conservative, and smaller conservative alert limits can be determined through the use of better processors in the receiver.

The above embodiments were explained with reference to the satellite navigation system Galileo. However, this satellite navigation system was chosen only as an example. The inventive method and the inventive device can also be used for any other existing and future satellite navigation system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining protection levels in a satellite navigation system, which method comprises:
   determining, with a device for receiving signals of the satellite navigation system, an integrity risk at an alert limit for a plurality of application situations;
   determining, with said device, alert limit intervals between horizontal and vertical alert limits producing an excessive integrity risk that exceeds a specified integrity risk and horizontal and vertical alert limits producing an acceptable integrity risk that does not exceed said specified integrity risk;
   carrying out, with said device, interval nesting sequences for the alert limit intervals determined by (a) determining horizontal integrity risks at centers of horizontal intervals and changing ends of the horizontal intervals until the horizontal interval size is no larger than a selected percentage of a lower horizontal alert limit, and (b) determining vertical integrity risks at centers of vertical intervals and changing ends of the vertical intervals until the vertical interval size is no larger than a selected percentage of a lower vertical alert limit;
   setting, with said device, a horizontal protection level to an upper end of the horizontal interval having said horizontal interval size; and
   setting, with said device, a vertical protection level to an upper end of the vertical interval having said vertical interval size.

2. A device for determining protection levels in a satellite navigation system, which device comprises:
   a receiver that receives satellite navigation system signals; and
   a processor for:
      determining from said satellite navigation system signals an integrity risk at an alert limit for a plurality of application situations;

determining alert limit intervals between horizontal and vertical alert limits producing an excessive integrity risk that exceeds a specified integrity risk and horizontal and vertical alert limits producing an acceptable integrity risk that does not exceed said specified integrity risk;

carrying out interval nesting sequences for the alert limit intervals determined by (a) determining horizontal integrity risks at centers of horizontal intervals and changing ends of the horizontal intervals until the horizontal interval size is no larger than a selected percentage of a lower horizontal alert limit, and (b) determining vertical integrity risks at centers of vertical intervals and changing ends of the vertical intervals until the vertical interval size is no larger than a selected percentage of a lower vertical alert limit;

setting a horizontal protection level to an upper end of the horizontal interval having said horizontal interval size; and setting a vertical protection level to an upper end of the vertical interval having said vertical interval size.

3. The method as defined by claim 1, wherein said selected percentage of the lower horizontal alert limit is one percent of said lower horizontal alert limit.

4. The method as defined by claim 1, wherein said selected percentage of the lower vertical alert limit is one percent of said lower vertical alert limit.

5. The device as defined by claim 2, wherein said selected percentage of the lower horizontal alert limit is one percent of said lower horizontal alert limit.

6. The device as defined by claim 2, wherein said selected percentage of the lower vertical alert limit is one percent of said lower vertical alert limit.

\* \* \* \* \*